United States Patent
Hayashi et al.

(10) Patent No.: US 6,622,154 B1
(45) Date of Patent: Sep. 16, 2003

(54) ALTERNATE BOOTH PARTIAL PRODUCT GENERATION FOR A HARDWARE MULTIPLIER

(75) Inventors: Naoki Hayashi, Dallas, TX (US); Vijayanand Angarai, Dallas, TX (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/467,939

(22) Filed: Dec. 21, 1999

(51) Int. Cl.[7] ................................................ G06F 7/52
(52) U.S. Cl. ........................................ 708/620; 708/628
(58) Field of Search ................................. 708/290, 622, 708/630, 628, 500, 605, 625, 627, 620

(56) References Cited

U.S. PATENT DOCUMENTS 5,231,415 A * 7/1993 Hagihara .................... 708/630
5,677,863 A * 10/1997 Naffziger .................... 708/628
5,935,198 A * 8/1999 Blomgren .................... 708/290
6,411,979 B1 * 6/2002 Greenberger ............... 708/622

* cited by examiner

Primary Examiner—Chuong Dinh Ngo
Assistant Examiner—Chat C. Do
(74) Attorney, Agent, or Firm—Suiter West PC LLO

(57) ABSTRACT

In hardware multipliers, the generation of partial products is a necessary step in the process known to the art for efficient production of a final product. A way to increase the speed of hardware multipliers is through the use of the Booth algorithm. The alternate Booth partial product generation for hardware multipliers of the present invention is directed to a method and apparatus for eliminating the encoding of the bits of the multiplier prior to entering the partial product generating cell of the present invention which may result in less hardware and increased speed.

4 Claims, 6 Drawing Sheets

| m[i+2] | m[i+1] | m[i] | PPi[j] |
|---|---|---|---|
| 0 | 0 | 0 | 0 |
| 0 | 0 | 1 | M[j] |
| 0 | 1 | 0 | M[j] |
| 0 | 1 | 1 | M[j-1] |
| 1 | 0 | 0 | $\overline{M[j-1]}$ |
| 1 | 0 | 1 | $\overline{M[j]}$ |
| 1 | 1 | 0 | $\overline{M[j]}$ |
| 1 | 1 | 1 | 0 |

FIG. 5

ALTERNATE BOOTH PARTIAL PRODUCT GENERATION FOR A HARDWARE MULTIPLIER

FIELD OF THE INVENTION

The present invention relates generally to hardware multipliers, and more specifically to an apparatus and method for producing partial products which may be utilized in hardware multiplication.

BACKGROUND OF THE INVENTION

Many of the processes performed by information handling systems and the like involve the multiplication of binary numbers. In a multiplication function, there exists a multiplicand and a multiplier. Well known to the art, binary numbers are multiplied through a process of multiplying the multiplicand by the first bit of the multiplier. Next, the multiplicand is multiplied by the second bit of the multiplier, shifting the result one digit and adding the products. This process is continued until each bit of the multiplier has been multiplied by the multiplicand.

Each of the products produced by multiplying the multiplicand by a bit of the multiplier produces a number which is referred to as a partial product. The resulting product is formed by accumulating the partial products propagating the carries from the rightmost columns to the left. This process is referred to as partial product accumulation. Although this process works well for its intended purpose, it has a significant drawback in that in order to implement this process utilizing hardware, a significant number of items of hardware are required. As a result, implementing this process with hardware may be cost prohibitive and may be slow especially for large bit numbers.

In order to speed up the process, the Booth algorithm has been utilized. This algorithm allows for a reduction of the number of partial products using a redundant number system. When this process is implemented in hardware, the bits of the multiplier must be separately recoded in order to produce the partial products. Unfortunately, this requires an additional step which slows the process.

Consequently, it would be advantageous to provide an apparatus and method for generating partial products which did not require the additional step of recoding the multiplier bits. By eliminating the recoding of the multiplier bits, the process time is reduced.

SUMMARY OF THE INVENTION

Accordingly, the present invention is directed to a novel apparatus for the generation of partial products for a hardware multiplier. The partial product generator of the present invention does not require recoding of the bits of the multiplier prior to entering the partial product generator of the present invention in order to generate the partial products. The present invention is further directed to a method of producing partial products for a hardware multiplier by directly sending the multiplier bits to the partial product generator of the present invention.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 5 is a truth table representing exemplary combinations of multiplier bits and the partial product which may be produced by each combination of multiplier bits.

DETAILED DESCRIPTION OF THE INVENTION

Reference will now be made in detail to the presently preferred embodiments of the invention, examples of which are illustrated in the accompanying drawings.

Figure 1:
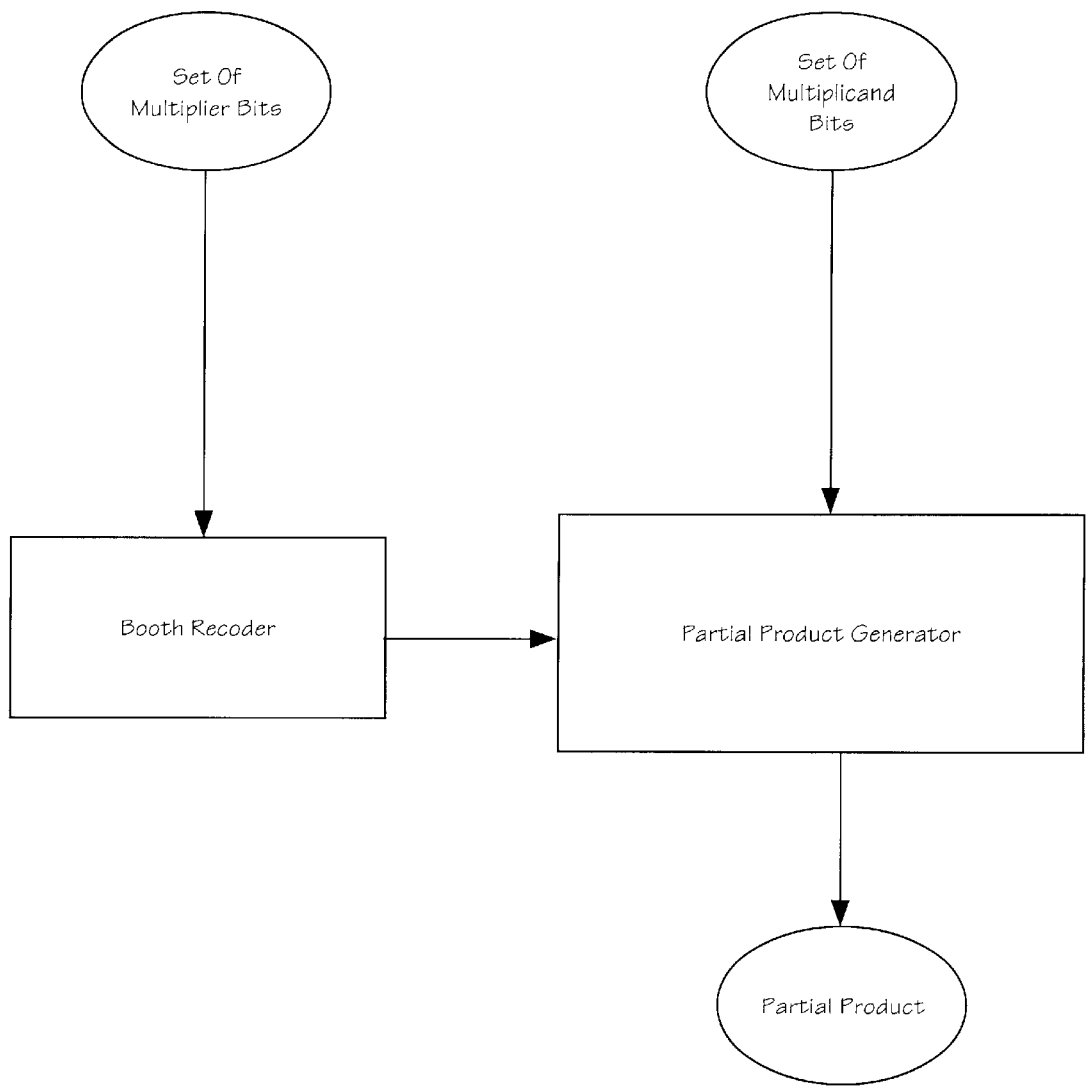
FIG. 1 is a block diagram representing a partial product generator well known to the art.

Referring now to FIG. 1, a partial product generator well known to the art is shown in block diagram form. Through the use of the Booth algorithm, it is desirable to calculate partial products and manipulate the partial products in order to obtain the final product of a multiplication function. In the multiplication of a set of multiplicand input bits and a set of multiplier input bits, the set of multiplier input bits must enter a Booth encoder. This is a necessary step because partial product generators known to the art are unable to calculate partial products without recoding the set of multiplier input bits. After recoding of the set of multiplier input bits, the recoded set of bits are connected to the partial product generator well known in the art. Upon the entering of the recoded set of bits to the partial product generator, the partial product is produced by selecting the proper multiple of the multiplicand.

Figure 2:
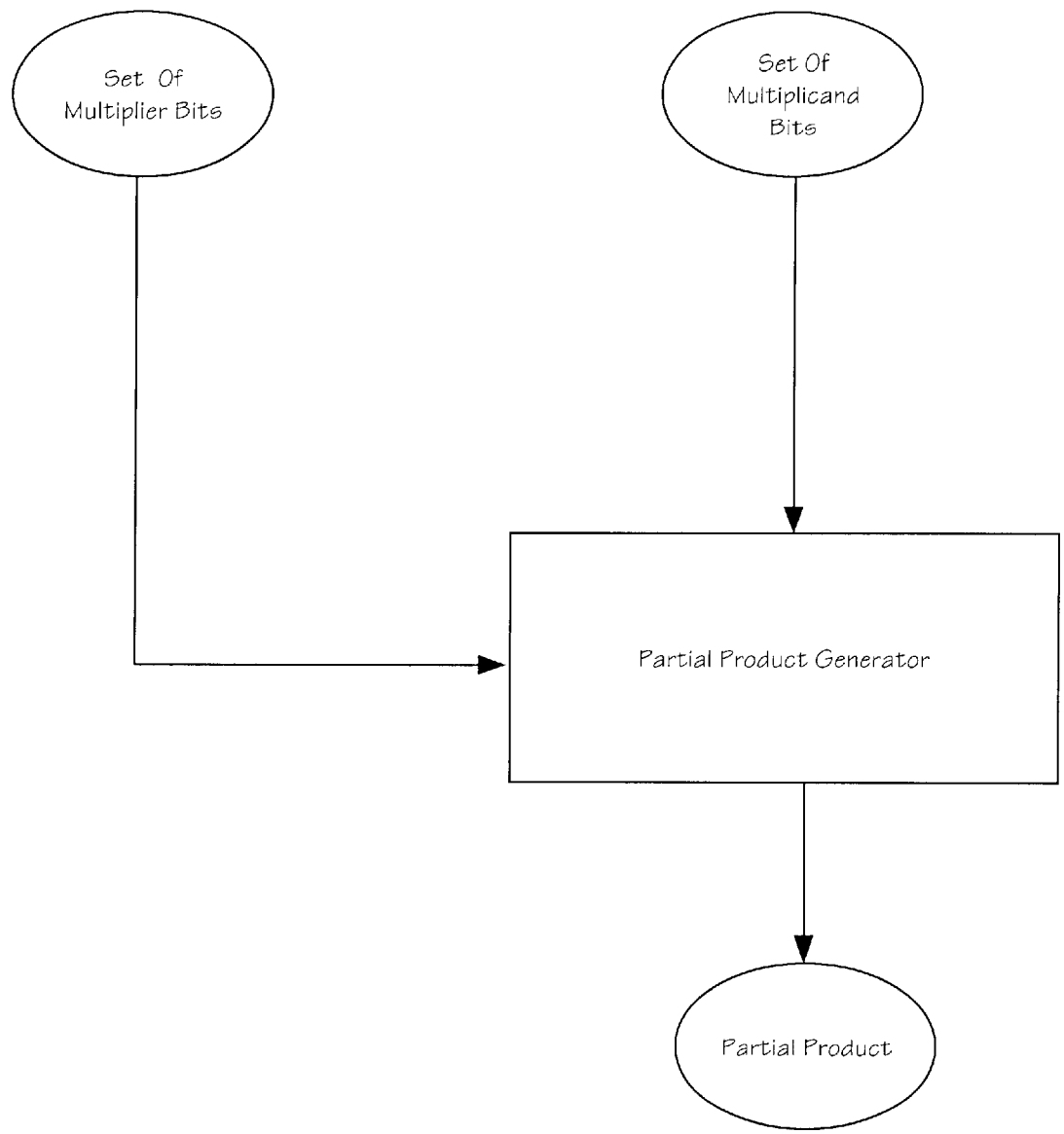
FIG. 2 is a block diagram representing an exemplary embodiment of the present invention.

A block diagram of the partial product generator of the present invention is shown in FIG. 2. The partial product generator of the present invention does not require that the set of multiplier bits be recoded prior to entering the partial product generator. As a result, a step in the process of hardware multiplication known to the art has been eliminated. This allows for faster generation of partial products which in turn allows for faster generation of a final product in a multiplication problem.

Figure 3:
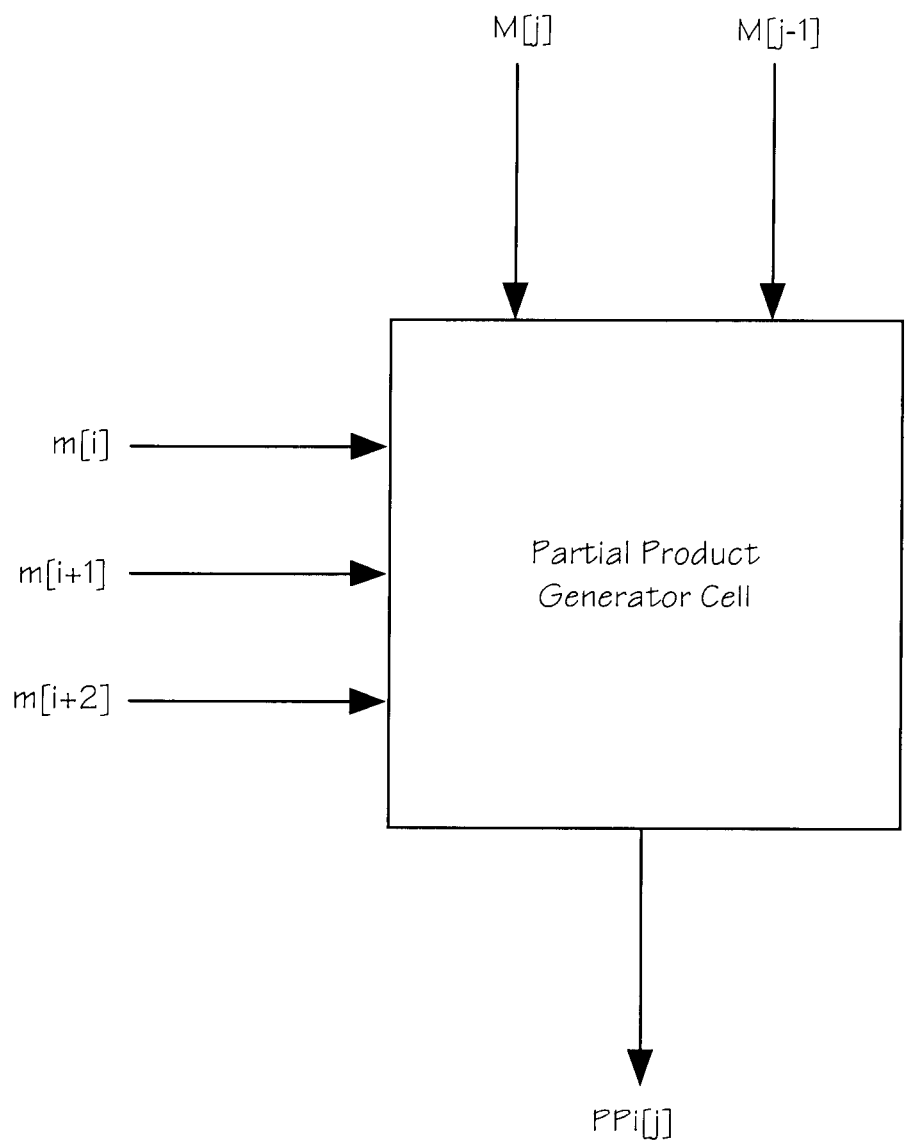
FIG. 3 depicts an exemplary partial product generator cell of the present invention.

A new and improved apparatus and method for generating a partial product as described in the present invention is shown in an exemplary fashion in a block diagram in FIG. 3. In an exemplary embodiment, the partial product generator cell of the present invention is capable of producing a bit j of the i-th partial product without recoding the set of multiplier input bits prior to entering the cell. FIG. 3 illustrates a three multiplier bit input and two multiplicand bit input embodiment which may be required for a radix 4 partial product. The multiplier bit inputs are represented by m[i], m[i+1], and m[i+2], and the multiplicand bit inputs are represented by M[J] and M[−1]. In an exemplary embodiment, the partial product generator cell generates bit j of the i-th partial product.

Figure 4:
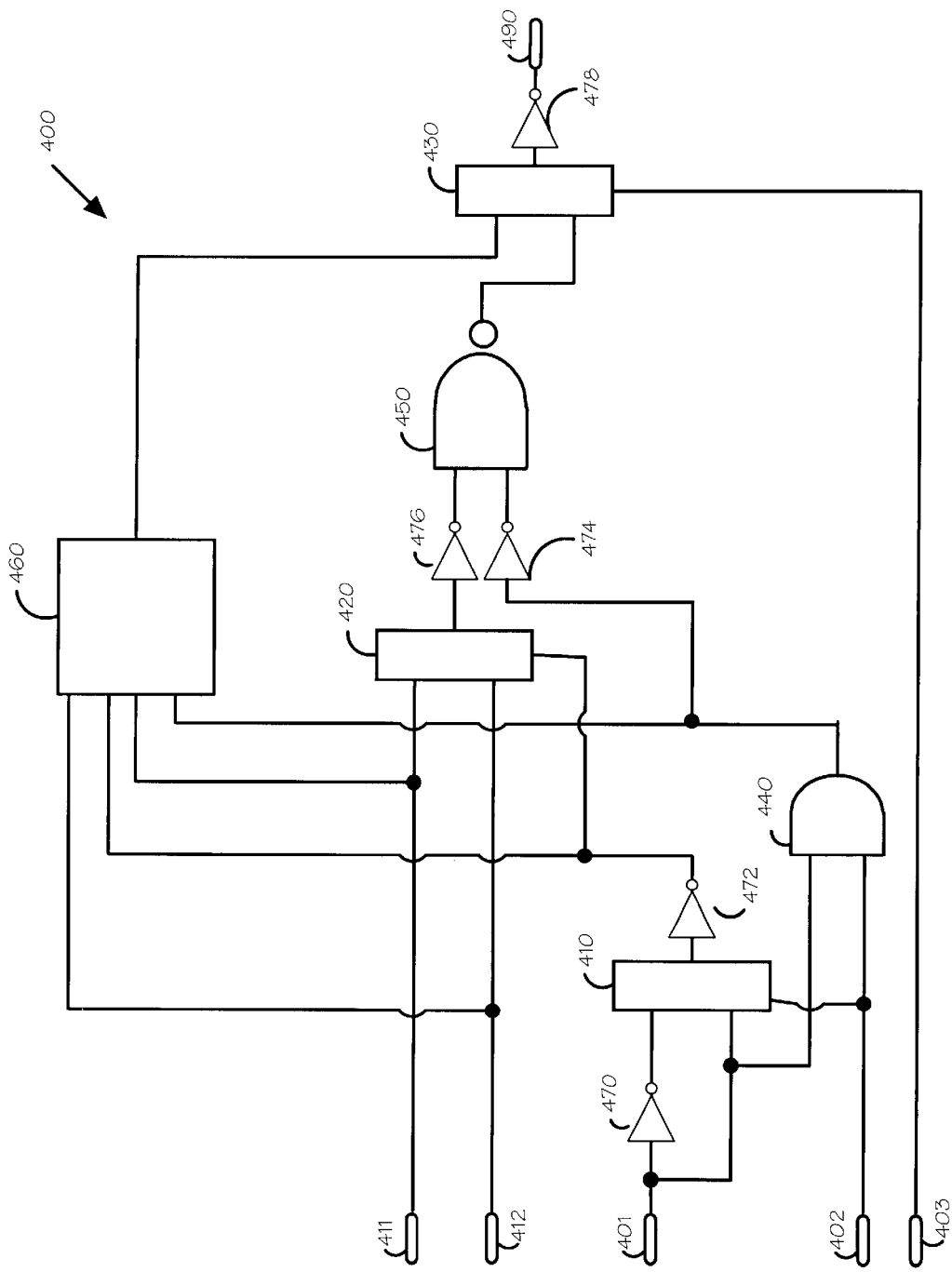
FIG. 4 is a schematic diagram of an exemplary partial product generator cell of the present invention.

The exemplary embodiment of the partial product generator cell of the present invention illustrated in a block diagram in FIG. 3 is illustrated in exemplary fashion in the schematic of FIG. 4. The cell comprises three multiplexors, each multiplexor includes two data inputs, a control input, and an output. The cell further comprises an AND gate, a NAND gate, five inverters and a two input two stack AOI gate. Each cell may calculate bit j of the i-th partial product for every combination of a set of three multiplier bits m[i], m[i+1], and m[i+2] and a set of two multiplicand bits M[j] and M[j−1].

A second data input of the first multiplexor 410 is connected to the output lead of an inverter 470 whose input lead is connected to a multiplier bit m[i] 401. The first data input of the first multiplexor 410 is connected to a multiplicand bit m[i] 401 directly. The control input of the first multiplexor 410 is connected to the multiplier bit m[i+1] 402. The output of the first multiplexor 410 is connected to the input of a second inverter 472 whose output is connected to a second input of the two input two stack AOI gate.

The first data input of the second multiplexor 420 is connected to the multiplicand bit M[j] 412. The second data input of the second multiplexor 420 is connected to the multiplicand bit M[j−1] 411. The control input of the second multiplexor 420 is connected to the output lead of a second inverter 472. The output of the second multiplexor 420 is connected to the input lead of a fourth inverter 476 whose output lead is connected to the second input of a NAND gate 450.

An AND gate 440 is another element of the cell whose inputs are the first multiplier bit 401 and the multiplier bit m[i+1] 402. The output of the AND gate 440 is connected to the first of the two input two stack AOI gate 460. The second and fourth inputs of the two input two stack AOI gate 460 are connected to the multiplicand bit M[j−1] 411 and the multiplicand bit M[j] 412 respectively. The output of the two input two stack AOI gate 460 is connected to a second data input of a third multiplexor 430. The output of the AND gate 440 is also connected to the input lead of a third inverter 474 whose output is connected to the first input of the NAND gate 450.

Referring now again to the third multiplexor 430, the output of the NAND gate 450 is connected to the second data input of the third multiplexor 430. The control input of the third multiplexor 430 is connected to a multiplier bit m[i+2] 403. The output of the third multiplexor 430 is connected to the input lead of a fifth inverter 478. The output lead of the fifth inverter 478 contains the bit j of the i-th partial product 490.

Referring now to FIG. 5, a truth table for the exemplary embodiment shown in FIG. 4 is displayed. By looking at the bits of the multiplier, one is able to determine the bit j of the i-th partial product partial through the utilization of the exemplary circuit of FIG. 4. The bit j of the i-th partial product may be the same as what would have been produced under the process known to the art, yet may be produced faster as a result of the elimination of an additional step of recoding the bits of the multiplier.

Figure 6:
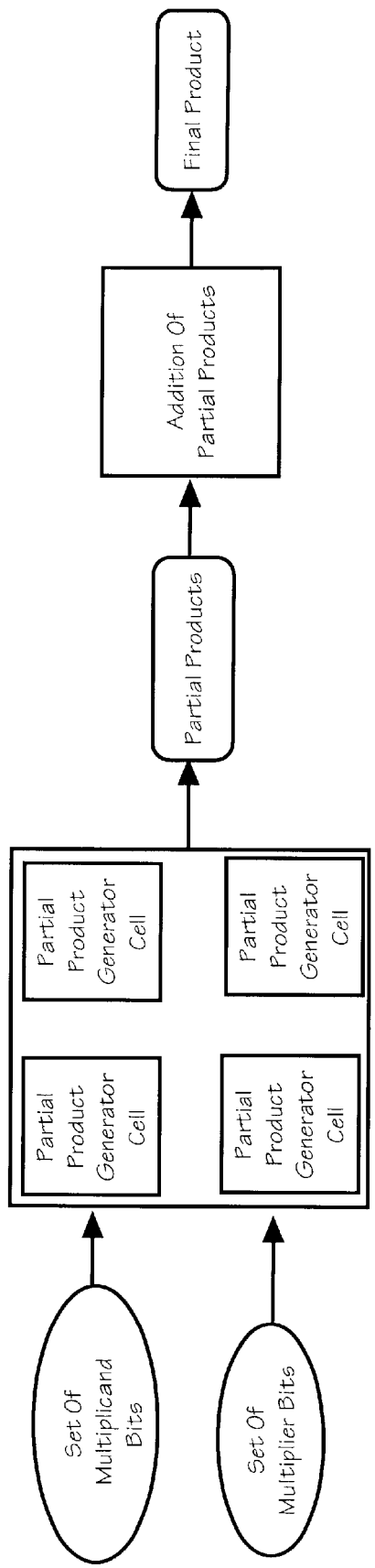
FIG. 6 is a flow diagram representing the stages of the multiplication process.

An exemplary process of producing a final product is shown in FIG. 6. The number of multiplicand bits and multiplier bits may determine which of the partial product generator cells of the present invention is utilized in order to produce the bit J of the i-th partial product. The exemplary embodiment of the partial product generating cell of the present invention is not limited to a set of three bit multipliers and a set of two bit multiplicands as required for a radix 4 Booth encoder. The apparatus and method may be implemented with radices of greater bases including but not limited to a radix 8 Booth encoder without departing from the scope and spirit of the present invention.

It is believed that the method and apparatus for alternate Booth partial product generation for a hardware multiplier of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A partial product generator cell suitable for hardware implementation of multipliers having three multiplier bits and two multiplicand bits, comprising:

(a) a first multiplexor having two data inputs, a control input, and an output, a first data input being connected to a first multiplier bit and said control input being connected to a second multiplier bit;

(b) a second multiplexor having two data inputs, a control input, and an output, said data inputs being connected to a first multiplicand bit and a second multiplicand bit;

(c) a third multiplexor having two data inputs, a control input, and an output, said control input being connected to a third multiplier bit;

(d) a AND gate having two input leads and an output lead, wherein a first input lead is connected to said first multiplier bit and a second input lead is connected to said second multiplier bit;

(e) a NAND gate having two input leads and an output lead, said output lead being connected to a first data input of said third multiplexor;

(f) a two input two stack AOI gate having a first, second, third, and fourth input leads, and an output lead, said first input lead being connected to said output lead of said AND gate, said second input lead being connected to a first multiplicand input bit, said fourth input lead being connected to a second multiplicand bit, and said output lead being connected to a second data input of said third multiplexor;

(g) a first inverter having an input lead connected to said first multiplier bit and an output lead connected to a second data input of said first multiplexor;

(h) a second inverter having an input lead connected to said output of said first multiplexor and an output lead connected to said third input lead of said two input two stack AOI gate;

(i) a third inverter having an input lead connected to said output lead of said AND gate and an output lead connected to a first input lead of said NAND gate;

(j) a fourth inverter having an input lead connected to said output of said second multiplexor and an output lead connected to a second input lead of said NAND gate; and (k) a fifth inverter having an input lead and an output lead, wherein said input lead is connected to said output of said third multiplexor.

2. The partial product generator cell as claimed in claim 1, wherein a partial product is produced at said output lead of said fifth inverter.

3. The partial product generator cell as claimed in claim 1, wherein the first, second and third multiplier bits are directly utilized to perform the selects of the first and second multiplicand to generate partial products.

4. The partial product generator cell as claimed in claim 1, wherein said generator may be placed within a single cell.

* * * * *